(12) United States Patent
Brandts et al.

(10) Patent No.: US 7,481,938 B2
(45) Date of Patent: Jan. 27, 2009

(54) METAL COMPOUND REMOVAL

(75) Inventors: Jim Aloysius Maria Brandts, Delft (NL); Pieter Hildegardus Berben, Maarn (NL)

(73) Assignee: BASF Catalysts LLC, Florham Park, NJ (US)

( * ) Notice: Subject to any disclaimer, the term of this patent is extended or adjusted under 35 U.S.C. 154(b) by 405 days.

(21) Appl. No.: 10/520,914

(22) PCT Filed: Jul. 7, 2003

(86) PCT No.: PCT/US03/21439

§ 371 (c)(1),
(2), (4) Date: Jul. 1, 2005

(87) PCT Pub. No.: WO2004/005557

PCT Pub. Date: Jan. 15, 2004

(65) Prior Publication Data

US 2006/0151399 A1  Jul. 13, 2006

(51) Int. Cl.
*C02F 1/62* (2006.01)

(52) U.S. Cl. ........................ 210/714; 210/679; 210/723; 210/763; 210/912; 502/24; 502/27

(58) Field of Classification Search ................. 210/714
See application file for complete search history.

(56) References Cited

U.S. PATENT DOCUMENTS

| 2,608,534 | A | * | 8/1952 | Fleck .......................... 502/211 |
| 3,485,763 | A | | 12/1969 | Lefevre et al. |
| 4,272,400 | A | * | 6/1981 | Silbernagel et al. ........... 502/25 |
| 4,413,118 | A | * | 11/1983 | Roberts et al. ................ 536/7.1 |
| 4,460,474 | A | * | 7/1984 | Blasius et al. ................ 210/679 |
| 4,677,085 | A | * | 6/1987 | Nevitt .......................... 502/26 |
| 4,826,604 | A | * | 5/1989 | Faubel et al. ................. 210/661 |
| 4,828,718 | A | * | 5/1989 | Habermann et al. ......... 210/763 |
| 5,897,768 | A | * | 4/1999 | McVicker et al. ........... 208/215 |
| 6,833,124 | B2 | * | 12/2004 | Phelps et al. .................. 423/55 |

FOREIGN PATENT DOCUMENTS

| DE | 268 166 | 5/1989 |
| EP | 1 080 784 | 3/2001 |
| SU | 1036775 | 8/1983 |
| WO | WO 00 29107 | 5/2000 |

OTHER PUBLICATIONS

International Search Report, PCT/US03/21439, Oct. 20, 2003.

* cited by examiner

*Primary Examiner*—Peter A. Hruskoci
(74) *Attorney, Agent, or Firm*—Raymond F. Keller; Gregory Turocy

(57) ABSTRACT

The present invention relates to a process for separating at least one metal compound and/or a component thereof from a mixture, said process comprising contacting the said mixture with a heteropoly acid or heteropoly acid anion, thereby producing a precipitate comprising the heteropoly acid or heteropoly acid anion and the metal compound and/or a component thereof. The present invention further relates to a process for the purification of a mixture containing at least one metal compound, said process comprising contacting the said mixture with a heteropoly acid or heteropoly acid anion, thereby producing a precipitate that is substantially insoluble in the said reaction mixture and recovering the reaction mixture.

20 Claims, No Drawings

METAL COMPOUND REMOVAL

The invention is directed to a process for the removal of metal compounds, such as a catalyst or catalyst remains from liquid reaction systems. More in particular the invention is directed to the removal of metal compounds, such as a catalyst or catalyst remains, from homogeneously catalysed reaction systems.

Metal compounds are applied in a variety of applications, e.g. as catalysts, colourants or pharmaceutically active compounds.

Catalysts based upon metal complexes, generally comprise at least one metal compound that at least consists of at least one metal atom and/or at least one ligand, or at least one metal ion and/or at least one counter ion and/or at least one ligand. Such catalyst systems are very effective and selective catalysts in homogeneous catalyst systems for a broad range of reactions. However, it is often very difficult to remove the (homogeneous) catalyst or its remains from the reaction mixture after the reaction has been completed. Quite often difficult extraction procedures, recrystallizations, membrane filtrations or distillation steps are necessary to remove the catalyst or its remains.

Other methods describe a modification of homogeneous catalysts that simplifies separation from the reaction products. However, such a modification of a homogeneous catalyst also changes its catalytic properties.

Catalysts and/or its remains have to be removed from a process stream in order to obtain pure products. A simple and efficient method to purify process streams from catalysts and/or its remains is desirable, also from an economic and environmental point of view.

U.S. Pat. No. 4,413,118 describes a process in which organic sulfur compounds containing a carbon-sulfur double bond are used to remove homogeneous catalyst group VIII metals from chemical process streams. U.S. Pat. No. 4,855,400 describes the removal of catalyst residues from carbon monoxide/olefin polymers with a catalyst complexing agent for palladium. U.S. Pat. No. 4,952,304 describes the removal of a group VIII catalyst and co-catalyst by treating the contaminated product with an aqueous solution of a silicate, borate or carbonate. The catalyst residues are extracted in the aqueous layer.

Fedotov et al. describe the use of membranes to separate a bulky homogeneous catalyst from the reaction mixture in *Catalysis Letters* 1990, 6, 417-422.

U.S. Pat. Nos. 6,303,829 and 6,307,108 describe the use of fractional countercurrent extraction to remove metal-organophosphorus complexes from the reaction product fluid. U.S. Pat. No. 4,429,057 describes the removal of volatile precious metal catalysts from a process stream by selective extraction in alcoholic liquids. U.S. Pat. No. 4,950,629 describes the precipitation of homogeneous catalysts from a reaction solution solvent by reaction with lower alkanoic acid.

U.S. Pat. No. 6,187,962 describes the separation of a homogeneous catalyst from a hydroformylation process stream by extraction methods.

U.S. Pat. No. 4,353,810 describes the removal of an iron oxidation catalyst by reaction of the iron catalyst with an iron oxidant material which will cause the precipitation of the iron catalyst.

Many of the described processes have a lack of efficiency and only partly remove catalyst residues. Moreover, the additives that are used contaminate the product mixtures and are difficult to remove from the process stream. This makes the described methods unattractive from a process point of view.

It is an object of the present invention to provide a process that does not have all the aforementioned disadvantages.

The invention is based on the idea that certain compounds, in particular heteropoly acids, have the property to bind very effectively and selectively with metal compounds i.e. compounds comprising at least one metal atom or ion such as homogeneous metal catalysts, thereby forming an insoluble precipitate. These heteropoly acids can also be attached to supports such as those based on various insoluble oxides and organic supports.

Accordingly the present invention relates to a process for separating at least one metal compound and/or a component thereof from a mixture, said process comprising contacting the said mixture with a heteropoly acid or heteropoly acid anion, thereby producing a precipitate comprising the heteropoly acid or heteropoly acid anion and the metal compound and/or the component thereof. It will be appreciated that in general the precipitate is substantially insoluble in the said mixture (under the contacting conditions).

Accordingly, it is possible to contact a mixture—generally at least comprising the metal compound—containing the metal compound(s), with a heteropoly acid or with a support material modified with a heteropoly acid, so that the metal compound and/or a component thereof can be removed from the mixture by separating the resulting solids from the mixture. This invention provides a tool to efficiently remove metal compounds, such as catalysts or catalyst remains from a liquid, e.g. a liquid process stream. The invention is particularly suitable to remove or recover a homogeneous metal compound or a component thereof dissolved in a liquid solution, from a liquid solution; further, the invention is particularly suitable to purify a solution containing a homogenous metal compound.

The term homogeneous metal compound is used herein to describe a metal compound dissolved in a solvent, a metal compound present in a colloidal phase (hereinafter referred to as colloidal metal compound), a dispersed metal compound, a metal compound in an emulsion, a metal compound in a sol and in general to describe metal compounds that are present in a fluid system in a fashion that does not generally allow the metal and/or metal compound to be readily separated by filtration from the fluid.

Components of metal compounds that can be separated include unbound metal moieties, ligands and counter ions.

A mixture from which the metal compound and/or a component thereof is separated can be any fluid containing said metal compound and/or component thereof dissolved, suspended, dispersed or otherwise contained in said fluid.

A process according to the invention may be used to achieve a partial or an essentially complete removal of metal compounds and/or components thereof such as catalysts or catalyst remains. Of course it is possible that several types of metal compounds and components are removed simultaneously or subsequently in a process according to the invention.

Very good results have been achieved with a method according to the invention wherein a compound comprising and ionic metal moiety is removed. It is stressed that the ionic metal moiety can either be anionic (e.g. Ru$^-$) or cationic.

The present invention is not limited to the removal of catalysts and/or remains thereof. A process according to the invention may also be used to remove or purify other metal compounds, e.g. complexes used as colourants or metal chelates for pharmaceutical purposes.

The invention may be employed to recover metal compounds or to purify products such as pharmaceuticals or foodstuffs, that may be contaminated with metal compounds, such as catalysts or remains thereof that have leached from a (supported) catalyst into the product.

In an embodiment, the invention is directed to a process for the removal of at least one homogeneous metal compound (and/or a component thereof, preferably a dissolved metal compound or a colloidal metal compound, from a mixture— e.g. a reaction mixture—said process comprising contacting the said mixture with a heteropoly acid optionally anchored to an insoluble support, thereby producing a precipitate.

In an embodiment, the invention is directed to a process for the purification of a mixture containing at least one homogeneous metal compound (and/or a component thereof, preferably a dissolved metal compound or a colloidal metal compound, said process comprising contacting the said mixture with a heteropoly acid, optionally anchored to an insoluble support, thereby producing a precipitate and recovering the mixture.

In an embodiment, the invention is directed to a process for the recovery of at least one homogeneous metal compound (or a component thereof), preferably a dissolved metal compound or a colloidal metal compound, e.g. a homogeneous metal catalyst from a mixture, said process comprising contacting the said mixture with a heteropoly acid, optionally anchored to an insoluble support, thereby producing a precipitate that is substantially insoluble in the said mixture and recovering the metal compound or one or more components thereof from the said precipitate.

The invention is also embodied in a process for carrying out a chemical reaction, wherein a reaction mixture, after completion of the reaction is contacted with a heteropoly acid, optionally anchored to an insoluble support.

The present invention comprises an embodiment wherein a heteropoly acid or an anion thereof is added to a mixture, thereby forming an insoluble precipitate with the metal compound (or with an unbound atomic or ionic metal moiety), which can be separated from the mixture using conventional separation techniques. It is assumed that the heteropoly acid or anion thereof interacts with the metal species, thereby forming complex that is insoluble (under the contacting conditions). In case the metal species is complexed with one or more ligands, these ligands will generally stay attached to the metal and will be removed together with the said insoluble complex. This makes it possible to recover at least part of the ligands too, which may be important in case the ligands are expensive and/or contaminate the product mixture.

The invention further comprises an embodiment wherein the heteropoly acid or anion thereof is bound in some way to a support material. The same principles apply in that case, but additional advantages are that the of risk contamination of the mixture with heteropoly acids or anions is avoided or at least significantly reduced. Further, it facilitates separation of the metal compound from the process stream, because liquid-solid separation can readily be employed and it is possible to separate the mixture and the metal compound attached to the heteropoly acid in a fixed-bed application.

This invention allows the binding of homogeneous metal compounds or components thereof, preferably dissolved metal compounds or colloidal metal compounds—such as homogeneous metal catalyst, catalyst remains or metal based colour-indicating means—from a (reaction) mixture. In this respect the terms catalyst and catalyst remains are both used to indicate all those components that can be present in a (homogeneously) catalysed reaction mixture. Such a catalyst or catalyst remains typically at least consists of at least one metal atom and/or at least one ligand, or at least one metal ion and/or at least one counter ion and/or at least one ligand. More in particular this includes all catalyst related components that are present in the (reaction) mixture, such as precursors of a catalyst, the active catalyst and the decomposition products of the catalyst, or catalysts or remains thereof that have leached from a (supported) catalyst into the reaction mixtures.

The removal may refer to removing at least part of the metal species, but also, if applicable, to removing the ligand(s), and/or the counter ions. When using the term catalyst, it is to be understood, that this encompasses all said components.

More in particular, the invention is useful for removing metal complexes, such as catalyst materials, that consists of at least one metal atom and/or at least one ligand, or at least one metal ion and/or at least one counter ion and/or at least one ligand. Such complexes may be represented by the formula $M_m(L)_nX_p$ wherein M represents a metal atom or metal ion, preferably a transition metal atom or ion, more preferably Rh, Ru, Ir, Pd, Pt, Ni or an ion thereof, wherein each L represents an organic or inorganic molecule with electron donating properties, preferably a molecule containing one or more heteroatoms like P, S, N or O or a molecule containing one or more unsaturated bonds, more preferably a molecule selected from the group consisting of phosphines, nitrogen and/or oxygen containing ligands (e.g. acetonitril, CO or $H_2O$), cyclic dienes (e.g. cyclooctadiene (cod)), cyclic trienes;

wherein m is at least 1;

wherein n is an integer in the range of 0-6;

wherein each X– represents an inorganic moiety, preferably selected from the group consisting of H–, Cl–, $BF_4$–, $ClO_4$–, $SbF_6$–, $NO_3$–, $PF_6$–, anionic organic molecules and negatively charged complexes of a metal ion; preferred examples of such negatively charged complexes of a metal ion include transition metal ion complexes (e.g. of Rh, Ru, Ir, Pd, Pt, an actinide, a lanthanide) and complexes of an alkaline earth metal ion;

wherein p is an integer chosen in the range of 0-8.

Dissolved and/or finely and stable dispersed clusters of metal complexes of the formula $M(L)_nX_p$ and multimetallic compounds (i.e. wherein m>1) are included. The compound may comprise more than one metal moiety, e.g. in the case of a colloidal metal compound.

Particular good results have been achieved with a process to remove compounds with a single metal moiety per compound (i.e. m=1).

A couple of examples of metal complexes that can be removed in a process according to the invention are the complexes that are obtained from the precursor complexes [Rh((R,R)-Me-DuPHOS)(COD)]$BF_4$((R,R)-Me-DuPHOS=(–)-1,2-bis((2R,5R)-2,5-dimethylphospholano)benzene), [Ru((R)-BINAP)$Cl_2$]$_2$.$Net_3$((R)-BINAP=(R)-(+)-2,2'-bis(diphenylphosphino)-1,1'-binaphthyl), $Pd(OAc)_2$, $Rh(CO)(H)(PPh_3)_3$, $NiNO_3(H_2O)_6$. "COD" represents 1,5-cyclooctadiene, "$NEt_3$" represents triethylamine, "Ac" represents an acetic acid moiety, and "$PPh_3$" represents triphenyl phosphine.

Also metal compounds originating from dispersed heterogeneous materials that have been added to the reaction mixture for catalytic purposes or other reasons can be removed by a process according to the present invention.

Heteropoly anions are polymeric oxoanions (polyoxometalates) that may be formed by condensation of two or more kinds of oxoanions. Heteropoly acids are protonated heteropoly anions. The term heteropoly compound (HPA) is used for the acid forms and the salts. Unless indicated otherwise, the term heteropoly acid is used herein to describe both the acid form and the salt. Heteropoly anions are composed of oxides of adenda atoms (V, Nb, Mo, W, etc) and heteroatoms (P, Si etc). The structures are classified into several groups based on the similarity of the composition and structure such as Keggin-type, Dawson species, Waugh species, Anderson species, Silverton species and their lacunar and other crystalline or non-crystalline forms and anions of the preceding. The heteropoly compounds contain one or more strong protons which can partly or completely be replaced by alkali, alkali earth or quaternary ammonium ions. Other HPA-related compounds are organic and organometallic complexes of polyanions. Keggin type heteropoly acids are preferred in this invention. Keggin-type heteropoly compounds generally are represented by the formula $(XM_{12}O_{40})^{m-}$, wherein X is a heteroatom, such as P, Si, etc, and wherein M is an addenda atom, such as V, Nb, Mo, W, etc. Examples of particularly suitable heteropoly acids are phosphotungstic acid (PTA), phosphomolybdic acid (PMA) and silicotungstic acid (STA).

As indicated above, the heteropoly acid may be used as such, or dissolved in a suitable solvent (solvents in which heteropoly acid dissolves e.g. polar solvents such as alcoholic solvents, $H_2O$) or attached to a support material. Obviously a mixture of several different heteropoly acids may be employed in accordance with the invention.

Contact between the supported or unsupported heteropoly acid or anion generally occurs in a liquid at a temperature of from about −80 degree C. to about 250 degree C. for a time period of from about 1 min. to about 50 hrs. Preferably, this occurs at temperatures of between about 20 degree C. and about 100 degree C. for a period of between 0.1 and 12 hours.

The ratio metal compound to heteropoly acid may be varied within a wide range depending upon the required purity of the treated reaction mixture and the desired speed of the removal process. For many purposes, e.g. for a complete removal of metal compounds, usually at least 1 equivalent of heteropoly acid is employed; herein, 1 equivalent is defined as 1 acidic site per metal ion or metal atom.

It is however possible to use a lower amount of heteropoly acid, e.g. because complete removal is not desired. The amount of heteropoly acid will typically be at least 0.1 and usually up to 4000 equivalents of heteropoly acid. Preferably 0.5-1000 equivalents of heteropoly acid are employed, if it is a goal to remove at least the majority of the metal compounds. Very suitable is an embodiment wherein 0.75-100 equivalents of one or more heteropoly acids were employed. Very good results have been achieved with an embodiment wherein 1-50 equivalents of heteropoly acid are used.

Typically, in a method according to the present invention the supported heteropoly acid or its anion is present in a weight ratio with the support of from about 0.01:1 to about 20:1.

Suitable support materials are insoluble oxides, organic supports and combinations thereof. Preferred examples of insoluble oxides are alumina, silica, zirconia, titania, zinc oxide, magnesium oxide, active carbons, zeolites clay materials and combinations thereof. Preferred organic supports are polymers, oligomers, composites and materials coated with an organic moiety. The supports may be structured materials, e.g. shaped materials such as a star shaped material or a maze or applied to another support such as a structured packing (monolith and the like).

The contacting can be done by any method that allows for the heteropoly acid or anion to be in good contact with the (reaction) mixture. In case of use of unsupported materials, it can simply be mixed into the reaction mixture in suitable quantity, followed by separating the insoluble complex from the liquid. The supported material may be brought into contact in a suitable way, such as by using a chromatographic method, using a fixed bed, under slurry reaction conditions or by using structured packing. After the (reaction) mixture and the solid support have been in contact, the metal compound, e.g. the catalyst or its remains, can be removed from the (reaction) mixture by simple filtration, sedimenation, centrifugation or decantation techniques. The metal compound may be recovered from the solid material, for example by washing with a solution containing suitable compounds or by removal of the support by methods employed in precious metal refinery.

A method according to the invention is particularly suitable for the removal of a metal catalyst or remains thereof from a reaction mixture, inter alia because usually the reaction products do not have any chemical interaction with the supported or unsupported heteropoly acids or anions, with or without attached homogeneous catalysts, and can be separated unaffectedly from the supported or unsupported heteropoly acids or anions, with or without attached homogeneous catalysts. This allows one to perform a homogeneous metal catalysed reaction and recover/remove the homogeneous catalyst remains by a simple method. In this way the catalyst can easily be recovered and/or a very pure reaction mixture can be obtained.

In case of the use of the support modified with heteropoly acids or anions in a fixed bed application, the reaction mixture that contains the metal compound, such as the catalyst or its remains, can be run through the bed. The metal compound will stick to the solid material and the product will flow through the bed unaffected. If desired the acidity of the fixed bed material can be modified by addition of a base, e.g. $Et_3N$ or LiOH and other salts. If the remains of the catalyst are coloured, saturation of the fixed bed can be followed visually.

Other ways to bind homogeneous catalyst remains to the modified support are slurrying the product solution with modified support material. After a certain time, the modified support material—with bonded catalyst remains—can be removed from the process stream by simple decantation, filtration, centrifugation or sedimentation techniques. The modified support material can be collected and the valuable materials—e.g. precious metals—can be recovered and re-used.

The modified support can be prepared by slurrying the support in a polar or apolar solvent, preferably in a solvent in which the heteropoly acid or anion is also soluble. To this suspension, a solution of heteropoly acid or anion is added, in which the weight ratio of the heteropoly acid or its anion with the support is present in from about 0.01:1 to about 20:1. In a method according to the invention the reaction between the support and the heteropoly acid is carried out at a temperature from −80 to 250 degrees C., preferably at a temperature between 0 and 100 degrees C. The reaction times can be varied within broad limits. The reaction time can for example suitably be chosen in the range of 1 minute to 50 hours, preferably between 2 and 16 hours. After the reaction is completed, the solid material can be washed with any solvent that could remove unsupported heteropoly acids or anions and the solid can be dried at a temperature between 0 and 500 degrees C., with or without applied vacuum.

The conditions for the present invention depend on the type of heteropoly acid, the nature of the metal complexes and the kind of reaction mixture. More in particular, the temperature may be between −80 and 250° C., whereas the pressure may vary between 100 and $10^{-5}$ bar (a).

The types of the chemical reactions contemplated in the context of the present invention are generally catalysed reductions, oxidations, couplings reactions, addition reactions, elimination reactions, and preferably (chiral) hydrogenations, (chiral) hydrogen transfer reactions, C—C coupling reactions (e.g. Heck, Suzuki, Stille, allylic substitutions, metathesis, polymerisations etc.), oxidations, (chiral) epoxidations, hydroformylations etc. In a preferred embodiment such chemical reactions are homogeneously catalysed reactions.

EXAMPLES

Preparation of Silicotungstic Acid Modified Alumina 150 grams of alumina (230 m$^2$, 150 micron particles) were suspended in 500 mL ethanol, technical grade. 32.95 grams of silicotungstic acid were dissolved in 100 mL ethanol and dropwisely added to the stirred alumina suspension in 1 hour at room temperature. After 14 hours the stirring was stopped, and after another 2 minutes the upper layer was removed by decantation. The remaining solids were washed several times with 1 l portions of demi H$_2$O to remove any unsupported silicotungstic acid. The solids were dried at 200 degrees C. Analysis with ICP showed that the alumina contained 11.7 wt % tungsten, which is equivalent to 18.0 wt % silicotungstic acid.

Removal of [Rh((R,R)-Me-DuPHOS)(COD)]BF$_4$ Catalyst Remains 12.6 mg of [Rh((R,R)-Me-DuPHOS)(COD)]BF$_4$ (21 micromol) were dissolved in a 20 mL methanol solution containing 6.33 grams of dimethyl itaconate (40 mmol) under a nitrogen atmosphere. The slightly orange coloured solution was transferred in a hydrogenation reactor. The reaction mixture was purged with H$_2$. The reaction mixture was stirred under a hydrogen pressure of 20 psig for two hours at ambient temperature (22 degrees C.).

A column (3.7 cm high, diameter 1.3 cm) was packed with 5.06 grams of silicotungstic acid modified alumina (18.0 wt % silicotungstic acid, determined by ICP). After two hours the orange coloured solution was transferred from the reactor to the top of the column. A colourless solution was collected at the bottom of the column containing 6.01 grams (95% yield) of the hydrogenated product in high enantiomeric purity (enantiomeric excess (e.e.) 97.5%, determined by Chiral GC). The colourless solution contained less than 10 microgram rhodium and less than 10 microgram of tungsten. The orange colour remained on the column. The solids from the column appeared to contain 11.7 wt % tungsten and 0.04 wt % rhodium (determined by ICP). The Rh presumably originates from the remains of the [Rh((R,R)-Me-DuPHOS)(COD)]BF$_4$ catalyst.

Removal of [Ru((R)-BINAP)Cl$_2$]$_2$.NEt$_3$ Catalyst Remains

The catalyst precursor [Ru((R)-BINAP)Cl$_2$]$_2$.NEt$_3$ was prepared as described by King et al. in *J. Org. Chem.* 1992, 57, 6689-6691. The catalytic test was also performed as described in this article using 18.2 mg of [Ru((R)-BINAP)Cl$_2$]$_2$.NEt$_3$ (21 micromol), 44 micromoles of HCl, 6.97 grams of t-butylacetoacetate (42.9 mmol) and 13 mL MeOH.

A column (7.5 cm high, diameter 1.3 cm) was packed with 10.0 grams of silicotungstic acid modified alumina (18 wt % silicotungstic acid, determined by ICP). After 12 hours the hydrogenation of t-butylacetoacetate was completed and the orange coloured solution was transferred from the reactor to the top of the column. A slightly yellow coloured solution was collected at the bottom of the column containing 6.46 grams (39 mmol, 91% yield) of t-butyl-3-hydroxybutyrate, the hydrogenated product, in high enantiomeric purity (e.e. 98%, chiral HPLC). The slightly coloured solution also contained 109 micrograms Ru (5% of total amount of ruthenium) and less than 10 microgram of tungsten (determined by ICP).

The invention claimed is:

1. Process for carrying out a catalysed chemical reaction, said process comprising reacting suitable reactants in a liquid phase in the presence of at least one homogeneous metal catalyst, contacting the resulting reaction mixture after completion of the reaction with a heteropoly acid or heteropoly acid anion that is anchored to a support material comprising an insoluble oxide, thereby producing a precipitate that is substantially insoluble in the said reaction mixture and separating the reaction mixture from the precipitate.

2. Process for separating at least one metal compound and/or a component thereof from a mixture containing catalyst and/or catalyst remains from a homogeneously catalyzed reaction, said process comprising contacting said mixture with a heteropoly acid or heteropoly acid anion that is anchored to a support material comprising an insoluble oxide, thereby producing a precipitate comprising the heteropoly acid or heteropoly acid anion and the metal compound and/or the component thereof, and separating the reaction mixture from the precipitate.

3. Process according to claim 2, wherein
the mixture is separated from the at least one metal compound and/or a component thereof and wherein a purified mixture is recovered; and/or
the precipitate is separated from the mixture and the at least one metal compound and/or one or more components thereof are recovered from the precipitate.

4. Process according to claim 2, wherein the metal compound and/or one or more components thereof is recovered from the support material.

5. Process according to claim 2, wherein an amount of heteropoly acid or heteropoly acid anion is at least 0.1 equivalent.

6. Process according to claim 2, wherein an amount of heteropoly acid or heteropoly acid anion is at least 1 equivalent.

7. Process according to claim 2, wherein the said metal compound and/or component thereof consists of at least one metal atom and/or at least one ligand, or at least one metal ion and/or at least one counter ion and/or at least one ligand.

8. Process according to claim 7, wherein at least one of the ligands is selected from the group consisting of organic and inorganic molecules with electron donating properties.

9. Process according to claim 8, wherein at least one of the ligands is selected from the group consisting of phosphines, nitrogen and/or oxygen containing ligands, cyclic dienes, cyclic trienes, CO and H$_2$O.

10. Process according to claim 7, wherein at least one of the ligands is selected from the group consisting of molecules containing one or more unsaturated bonds and molecules containing one or more heteroatoms, selected from the group consisting of P, S, N and O.

11. Process according to claim 2, wherein the support material is alumina.

12. Process according to claim 2, wherein the heteropoly acid and heteropoly acid anion, is selected from the group of Keggin type heteropoly acids and anions.

13. Process according to claim 2, wherein the metal compound is based on at least one metal from the group consisting of Rh, Ru, Ir, Pd and Pt.

14. Process according to claim 2, wherein the metal compound is derived from the group consisting of precursor complexes [Rh((R,R)-Me-DuPHOS)(COD)]BF$_4$((R,R)-Me-DuPHOS=(−)-1,2-bis((2R,5R)-2,5-dimethylphospholano) benzene), [Ru((R)-BINAP)Cl$_2$]$_2$.NEt$_3$((R)-BINAP=(R)-(+)-2,2'-bis(diphenylphosphino)-1,1-binaphthyl, Pd(OAc)$_2$, Rh(CO)(H)(PPh$_3$)$_3$, and NiNO$_3$(H$_2$O)$_6$, wherein COD represents 1,5-cyclooctadiene, Net$_3$ represents triethylamine, Ac represents an acetic moiety, and PPh$_3$ represents triphenyl phosphine.

15. Process according to claim 2, wherein the support material is situated in a fixed bed type conformation and the mixture is passed there through, whereby the metal compound is attached to the at least one heteropoly acid or heteropoly acid anion and removed from the said mixture.

16. Process according to claim 15, wherein the support material is present in a structured form.

17. Process according to claim 16, wherein the support material is selected from the group consisting of monoliths, star shaped materials and maze shaped materials.

18. Process according to claim 15, wherein the heteropoly acid or a heteropoly acid anion, or the support modified therewith, is slurried in the said mixture and subsequently removed therefrom.

19. Process according to claim 2, wherein the support material is selected from the group consisting of alumina, silica, zirconia, titania, zinc oxide, magnesium oxide, clay materials, zeolites.

20. Process according to claim 2, wherein the metal compound is dissolved in a solvent or present in a colloidal phase.

* * * * *